United States Patent [19]

Wysocki

[11] 4,420,170
[45] Dec. 13, 1983

[54] CAMBER ADJUSTMENT TOOL AND METHOD FOR STRUT TYPE VEHICLE SUSPENSION

[75] Inventor: Thomas J. Wysocki, Warren, Mich.

[73] Assignee: General Motors Corporation, Detroit, Mich.

[21] Appl. No.: 304,321

[22] Filed: Sep. 21, 1981

[51] Int. Cl.³ ............................................. B62D 17/00
[52] U.S. Cl. .................................................. 280/661
[58] Field of Search ....................... 280/661, 668, 663

[56] References Cited
U.S. PATENT DOCUMENTS

| | | | |
|---|---|---|---|
| 3,917,308 | 11/1975 | Schulz | 280/124 B |
| 3,999,779 | 12/1976 | Bishop | 280/661 |
| 4,194,760 | 3/1980 | Shiomi et al. | 280/661 |
| 4,213,631 | 7/1980 | Wilkerson | 280/661 |

*Primary Examiner*—Richard A. Bertsch
*Attorney, Agent, or Firm*—Dean L. Ellis

[57] ABSTRACT

Alignment of wheel camber in a strut type vehicle suspension is accomplished by a U-shaped tool which is hooked over the ends of one of the bolt fasteners between the strut and the wheel support member and which seats on the strut during graduated movement of the support member to a desired camber setting.

3 Claims, 4 Drawing Figures

U.S. Patent   Dec. 13, 1983   4,420,170
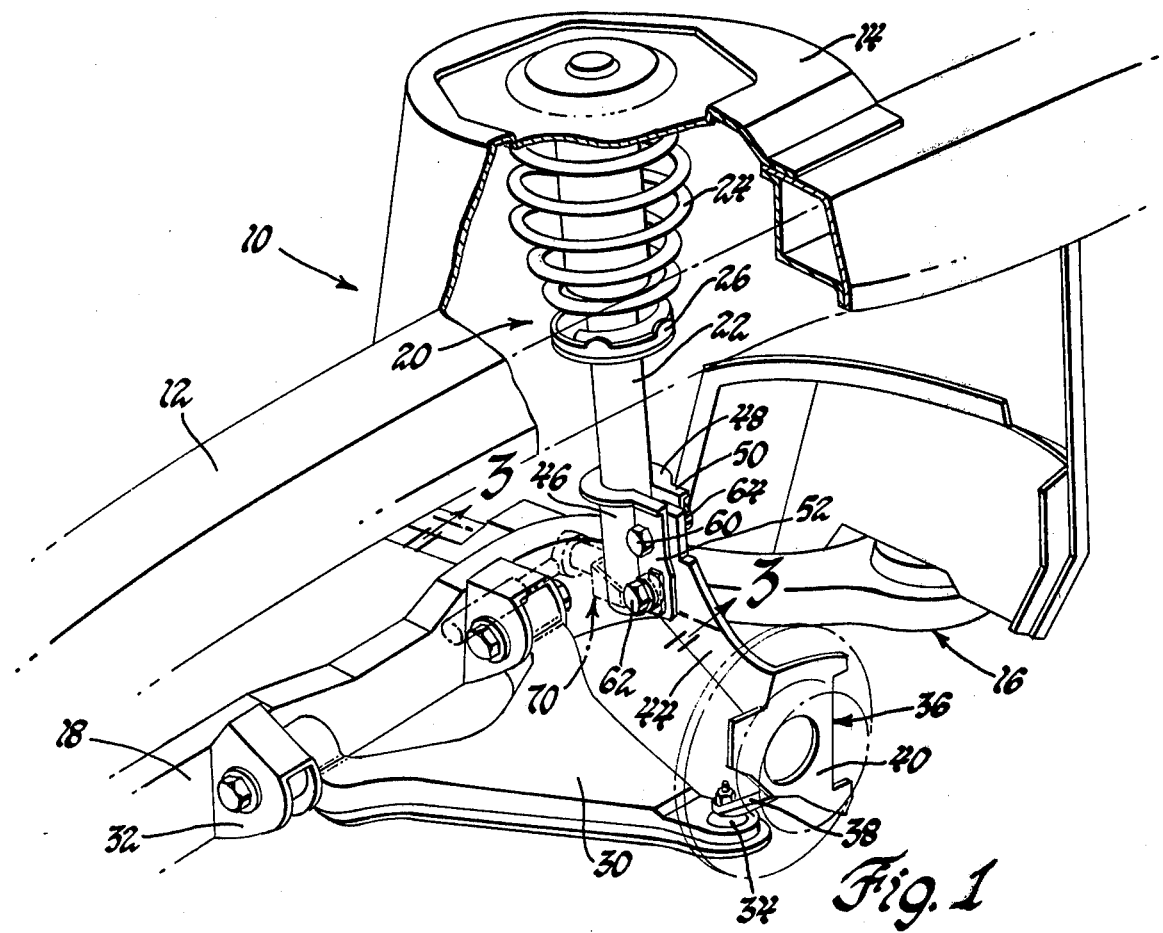
Fig. 1
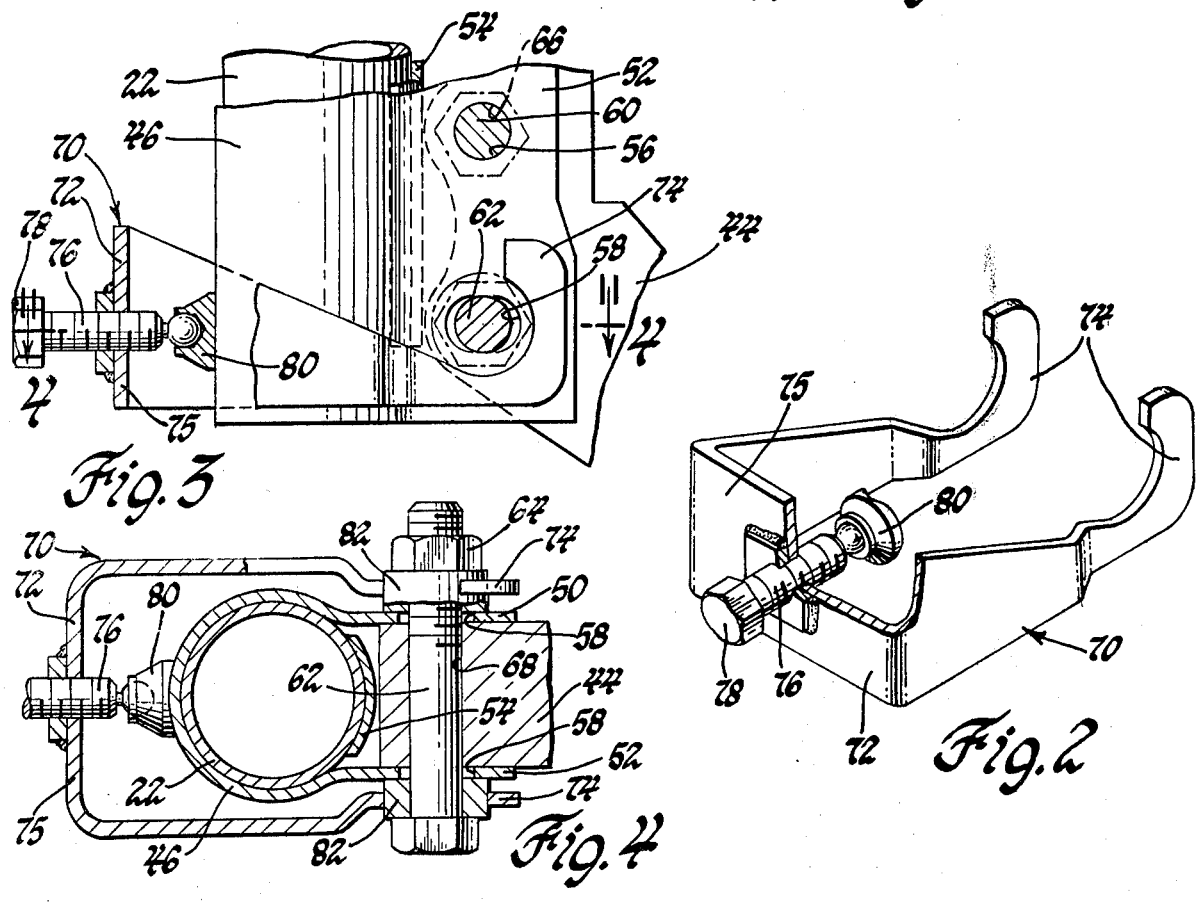
Fig. 3
Fig. 4
Fig. 2

CAMBER ADJUSTMENT TOOL AND METHOD FOR STRUT TYPE VEHICLE SUSPENSION

This invention relates to strut type vehicle wheel suspensions and more particularly to wheel camber and like wheel alignment provisions therein and to tools and methods for accomplishing the same.

It is known to provide strut type vehicle suspensions with adjustable interconnection between the lower end of the strut member and the wheel support knuckle permitting selection of wheel camber alignment. Schulz U.S. Pat. No. 3,917,308 discloses such an arrangement including a vertically spaced pair of through-bolt fasteners holding a clamping bracket on the strut lower end to a portion of the wheel support knuckle and further including a rotary cam element on one bolt on an axis of one of such members and trapped between guide cheeks on the other and rotatably adjustable to force such members angularly to varying camber relationships. Such cam construction tends to involve unduly precise operational routine by service technicians during camber setting with the use of wrenches at both ends of the combined through-bolt and cam element fastener device to achieve simultaneous loosening or tightening of such fastener, while also maintaining a precise angular position of the cam element. Further, practical embodiments of such a cam bolt fastener involve appreciable added expense both in the construction of the fastener itself and in provision on the supporting bracket of straddling cheeks or embossments with which the cam cooperates.

With the present invention, a service tool is provided which is adapted to fit more conventional fastener constructions for the strut suspension to enable wheel camber settings in service garages as the need may arise, and without the cost penalty of special camber adjustment elements embodied in each and every strut manufactured and installed in the vehicle as has been true in previous practice.

The tool is a U-shaped member having its legs hooked and spaced sufficiently apart to be received over the clamping bracket and have the legs hook over one of the through-bolt fastener assemblies which holds the wheel support member to the strut bracket. As in past practice, the bolt holes in the strut bracket for this one fastener assembly are enlarged to permit various angular relations between the strut and knuckle about the axis of the other through-bolt fastener. The tool includes a set screw device in the web thereof adapted to abut the strut bracket while the hooked ends are over the movable fastener so that as a selected camber setting is achieved between the strut and the knuckle, the same may be held against forces tending to disturb that setting.

In one application, the tool is useful to positively locate the suspension parts in a desired camber relation. A peculiar static force relationship arises in a variety of strut type suspensions, i.e., a force couple tends to drive the wheel support knuckle and wheel assembly toward a maximum negative camber condition. There, the tool may be arranged to partake of this force condition in such a way that the set screw thereof acts as a physical stop and ground member counteracting such force couple and when torqued may define and hold some selected wheel camber setting within a range thereof. Camber selection proceeds by threaded adjustment of the set screw completely independently of attention to tightening or loosening torque on the through-bolt fasteners. The bolt fasteners are first loosened and the camber setting is performed with the vehicle mass resting upon the wheels. The selected camber adjustment, once performed, is then very simply held by independent tightening operation of the conventional through-bolt fasteners, and again, without attention to the tool.

In other applications, where there is no strong static force situation as above-described, the tool is useful in holding camber settings performed by the mechanic via his simple forced movement of the wheel in the camber direction he desires. Manual force applied to the wheel is resisted by the tool to positively define the camber setting whereupon one of the strut fastener assemblies may be tightened to hold that setting and the tool then removed.

These and other objects, features and advantages of the invention will be readily apparent from the following specification and drawings wherein:

FIG. 1 is a fragmentary perspective view of a vehicle strut type suspension with parts partially in phantom and with the tool of this invention and a wrench applied thereto also being shown in phantom;

FIG. 2 is a perspective view of the tool;

FIG. 3 is an enlarged partially broken away fragmentary elevational view taken generally along the plane indicated by lines 3—3 in FIG. 1 with the tool applied for camber service; and FIG. 4 is a sectional view, taken generally along the plane indicated by lines 4—4 in FIG. 3.

Referring now particularly to FIG. 1 of the drawings, the tool of the invention is indicated in phantom, with a conventional wrench applied. The tool is illustrated in connection with suspension for an automotive vehicle chassis of frame/body integral construction which will be generally referred to as a vehicle sprung mass and indicated by the reference character 10. A frame rail 12 extends longitudinally of the sprung mass and has welded thereto a strut mounting panel or tower 14. A drive aggregate cradle 16 includes a longitudinal rail assembly 18 affording attachment points for the lower control arm element of a strut type suspension.

The strut suspension is designated generally as 20 and here illustrated at the left front wheel area. This type of suspension is, of course, equally applicable front or rear, driving or non-driving, and steerable or non-steerable. It includes a hydraulic shock absorber strut member 22 formed of telescopic upper and lower piston and cylinder members which, as is well known, are adapted to foreshorten or extend under wheel motion for dampening thereof. It also includes thereon a helical suspension spring 24 between a seat element 26 on the lower telescopic element and a seat, not shown, at the top of the strut member 22 associated with the upper piston element. Such upper seat may include appropriate rubber isolation and rotary bearing elements, all as is well known, and screw fasteners which fixedly attach such upper end of the strut member 22 to the tower 14 of the sprung mass in non-adjustable relationship therewith, in the present embodiment.

The lower control arm 30 of the suspension extends laterally from rubber bushed pivot connections 32 including brackets on the rail assembly 18, and carries a ball joint means 34 at its distal end adapted for connection to a wheel support member or knuckle. Such knuckle is designated generally as 36 and includes a lower mounting boss 38 attached by the ball joint 34 to the lower control arm. The knuckle 36 is of conventional configuration including suitable mounting means at 40 for a caliper type disc brake assembly, all as known in the art, as well as the usual mounting spindle, not shown, which may carry a vehicle wheel assembly. A portion 44 of knuckle 36 extends upwardly for connection to the strut member 22 in a manner now to be described.

Referring to FIG. 3, the lower end of the strut member lower element carrying the spring seat 26 is provided with a clamp type saddle bracket 46 of relatively heavy sheet metal stock provided with a reinforcement flange 48. It is of generally U-shape and may be spot welded or attached in similar manner to the lower element of the strut. Between the bracket legs 50 and 52 of such bracket 46, there is situated a reinforcing plate 54 attached to the cylindrical surface of the strut lower element. Upper and lower sets of aligned bolt holes 56 and 58, respectively, are provided in legs 50 and 52 to receive therethrough respective through-bolt fasteners 60 and 62, with nuts 64 threaded thereupon. The upper portion 44 of knuckle 36 is received between legs 50 and 52 and likewise includes upper (not shown), and lower apertures 68 closely receiving the bolts. Upper apertures 56 of the bracket are of a size to closely receive the bolt 62 while lower apertures 58 are substantially overlarge, for purposes to appear.

To set the chamber of the knuckle 36 and the wheel assembly mounted thereupon, the angular interrelation of the parts including strut 22, control arm 30 and the knuckle with its ball joint 34 is adjusted by selection of the angular relation between knuckle upper portion 44 and the saddle bracket 46. With the through-bolt fasteners 60 and 62 and nuts 64 thereon loose, the upper fastener 60 serves as an axis for such angular adjustment of the knuckle and the lower fastener 62 relative to the bracket and strut within the range of motion allowed in the overlarge lower aperture 58 of the bracket. Fastener 62 is closely held in the knuckle and force applied to that fastener for camber setting moves the knuckle and strut relatively about upper fastener 60.

To perform such camber setting with relative ease in the service garage I provide a tool 70 such as shown in FIG. 2. It comprises a main member 72 which is of generally U-shape. The legs of the main member are hooked at their ends 74 with an inner radius approximating that of the bolt head and nut or alternatively the washers, as will be seen below, on the fastener assembly 62. Thus, the hooked ends may be readily seated on such fastener parts and to that end, the two hooked legs of the tool are spaced the appropriate distance apart generally in the manner shown in FIG. 4. There, it is seen that the two legs of the tool are bent intermediate their ends to provide some clearance from the strut 22 while the ends are in place over the fastener 62. In the web or bight 75 of the tool a set screw device 76 is threadedly mounted, such device comprising a threaded shaft with an outer hexagonal wrench head 78 and with an inner ball head mounting a swivel seat 80. The swivel set is adapted to bear against the opposed side of the bracket 46 so that together they serve as a stop or ground reaction or reference point for the camber setting process.

In performing the camber setting procedure at a service facility, fasteners 60 and 62 are loose and the tool 70 is in place over the lower fastener 62 as described. The specific order of preparing for the setting will vary with different varieties of strut suspension as hereinbelow described, and also with preferences from shop to shop, but it is presumed that the mechanic will first have threaded the set screw 76 to positively abut its swivel seat 80 against the strut bracket preparatory to performing the camber adjustment. This being the case, a wrench such as shown in FIG. 1 may be used to then further thread the set screw device in the appropriate direction to either recede its inner end leftwardly, and permit reduction of the gap between the strut bracket 46 and web 75 of the tool, or conversely, thread the set screw rightwardly against the strut bracket and cause the tool to pull leftward to increase such gap between the strut bracket and the tool, all as viewed in FIG. 3. This controlled relative movement between the tool and the strut bracket while the former is hooked over lower fastener 62, of course serves to perform the desired graduated changes in the angular orientation of knuckle 36 relative strut 22 about the axis of upper fastener 60 within the range of motion permitted in enlarged apertures 58 of the bracket.

The positiveness of applying graduated change in camber by use of the tool 70 may arise from the static force situation which exists in many strut type suspensions in which, the vehicle sprung mass 10 resting on the vehicle wheels, there is a natural force couple, which, as viewed in FIG. 3, tends to rotate the knuckle 36 counterclockwise about the axis of the upper bolt 60. This static force situation of that class of suspension is further described in the patent application filed herewith, assigned to the present assignee and identified D-5,770. Thus, there is a bias in such type suspension tending the loosened knuckle 36 to a maximum negative camber condition and with tool 70 in place over the ends of lower fastener 62, the tool resists such bias to hold the suspension parts in position. Rotation of the set screw device may then proceed as has been described, for camber setting to the desired value, employing that natural bias either to indeed permit increased negative camber, or conversely impose torque upon the set screw to pull the tool leftwardly in FIG. 3 against that bias. Then, fastener 60 may be retightened and the tool removed for final tightening of both fasteners. In this connection it should be noted, that as seen in FIG. 4, the tool could be constructed with hooked ends 74 which are thin, or washers 82 underlying both the bolt head and the nut on lower bolt 62 may be of enlarged thickness to readily receive the hooked ends 74, without any interference from such tool to reception of wrench sockets upon the bolt head and the nut. Thus, preliminary or even final tightening of both the upper and the lower fasteners may occur prior to removing the tool 70 at the completion of the camber setting operation. Any risk of losing the set camber is thus avoided and this could be particularly useful in those strut suspensions with a very strong natural bias to negative camber as above described. In most cases however, preliminary tightening of upper fastener 60 alone could hold the adjusted camber and there the hooked ends 74 may be such as to hook directly upon the bolt head and nut or fastener 62.

In strut suspensions where no such strong geometric bias of the sprung mass does exist the tool 70 is useful to perform the camber adjustment with relative ease and positiveness. For example, the normal relation of the suspension parts may be such that there is little or none of the afore-described negative camber bias upon the strut and knuckle to change relation upon loosening of the fasteners 60 and 62. In such case, with the fasteners so loosened and the tool 70 installed over the lower fastener, the mechanic may wish to employ the tool as a positive resistance to added manual pressure he applies at, say, the top of the wheel assembly in a negative camber direction while at the same time adjusting set screw device 76. The tool thus serves for positive, non-jerky graduated adjustment of the gap between the web 75 of the tool 70 and the strut bracket in the same manner as above described, until the desired location of bolt 62 within apertures 58 is achieved, the tool then being removed as both fasteners are tightened.

It is of course apparent that tool 70 may be easily adapted to a strut bracket/knuckle construction somewhat converse to that shown and described, i.e., one where the overlarge bolt hole would be at knuckle aperture 68, for example, and bolt holes 58 of the bracket close-fitting. There, tool 70 could be arranged over fastener assembly 62 to extend outboard rather than inboard as in FIG. 3, and set screw device 76 could bear its swivel seat 80 against the knuckle rather than the strut. Similar variations are apparent as to interchanging fastener assemblies 60 and 62 as the axis of adjustment, and to the variations which would arise were natural suspension bias to be in the positive camber direction rather than negative as described.

It is of course apparent that the U-shape of the tool is significant in respect of being equal length legs which are adapted as via their hooked ends, to be applied to both ends of fastener 62. In that way the tool is adapted to apply a balanced distribution of force to the two ends of the fastener as set screw 76 is either torqued to pull the tool and knuckle or backed off during the camber adjustments described above, thus eliminating binding as well as assuring stability of the tool position during use.

The embodiments of the invention in which an exclusive property or privilege is claimed are defined as follows:

1. A tool for adjustment of the camber setting of vehicle strut suspension of the class including a wheel support member and an upstanding hydraulic strut member interconnected by a vertically spaced pair of through-bolt and nut fastener assemblies, a first of such assemblies being received in an overlarge bolt hole means of one of the strut and wheel support members to permit adjustment of the wheel support member relative to the strut about the axis of the other fastener assembly to a selected camber setting of the wheel support member, said tool comprising a U-shaped main member the legs of which are hooked at their ends and of generally equal length and spaced sufficiently apart to straddle the strut and be hooked over the ends of said first fastener assembly, and a set screw device threadably mounted in the web of the main member and including an inner end adapted to bear against said one member, the set screw device being threadable to define and hold various camber settings of the wheel support member relative the strut against forces tending to pull said web of the tool toward the strut.

2. A tool for adjustment of the camber setting of vehicle strut suspensions of the class including a wheel support member and an upstanding hydraulic strut interconnected by a vertically spaced pair of through-bolt, washer and nut fastener assemblies, the first of such assemblies being received in enlarged bolt holes of the strut to permit adjustment of the wheel support member relative to the strut about the axis of the other such assembly to a selected camber setting of the wheel support member, said tool comprising a U-shaped main member the legs of which are hooked at the ends and of generally equal length and spaced apart a distance to straddle the strut and hook over washers at the ends of said first fastener assembly, the thickness of said leg ends being adapted to the thickness of the washers whereby wrenches may be applied to the nut and bolt head of said first fastener assembly in the presence of said tool, and a set screw device threadably mounted in the web of the main member and including an inner end with a swivel seat thereon adapted to bear against the strut, the set screw device being threadable to define and hold various camber settings of the wheel support member against forces tending to pull said web of the tool toward the strut.

3. A method of adjustment of the camber setting of a vehicle strut suspension of the class including a wheel support member and an upstanding hydraulic strut interconnected by a vertically spaced pair of through-bolt and nut fastener assemblies, the first of such assemblies being received in enlarged bolt hole means of one of the strut and wheel support members to permit adjustment of the wheel support member relative to the strut about the axis of the other fastener assembly to a selected camber setting of the wheel support member, comprising the steps of hooking the ends of the legs of a U-shaped tool over the ends of said first fastener assembly, holding such tool with the web thereof fixed generally horizontally spaced from said one member, and with both fastener assemblies loose inducing graduated variation in the distance of such spacing until a desired camber setting is achieved, retightening one or both of said fastener assemblies to hold said setting, and removing said tool.

* * * * *